United States Patent
Wilson et al.

(10) Patent No.: US 10,089,937 B2
(45) Date of Patent: Oct. 2, 2018

(54) SPATIAL AND TEMPORAL MULTIPLEXING DISPLAY

(75) Inventors: Andrew D. Wilson, Seattle, WA (US); Steven Bathiche, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1237 days.

(21) Appl. No.: 12/819,238

(22) Filed: Jun. 21, 2010

(65) Prior Publication Data

US 2011/0310232 A1 Dec. 22, 2011

(51) Int. Cl.
| | |
|---|---|
| G02B 27/24 | (2006.01) |
| G09G 3/34 | (2006.01) |
| G09G 3/00 | (2006.01) |
| H04N 13/305 | (2018.01) |
| H04N 13/32 | (2018.01) |
| H04N 13/31 | (2018.01) |
| H04N 13/366 | (2018.01) |
| H04N 13/398 | (2018.01) |

(52) U.S. Cl.
CPC .......... *G09G 3/342* (2013.01); *G09G 3/003* (2013.01); *H04N 13/305* (2018.05); *H04N 13/31* (2018.05); *H04N 13/32* (2018.05); *H04N 13/366* (2018.05); *H04N 13/398* (2018.05)

(58) Field of Classification Search
CPC ........... H04N 13/0497; H04N 13/0239; H04N 13/0037; H04N 13/0055
USPC .................................. 348/51, 46, 52, 43, 44
See application file for complete search history.

(56) References Cited

U.S. PATENT DOCUMENTS

| | | | |
|---|---|---|---|
| 5,544,268 A * | 8/1996 | Bischel | G02F 1/011 385/16 |
| 5,771,066 A | 6/1998 | Barnea | |
| 6,055,012 A * | 4/2000 | Haskell | H04N 13/0014 348/48 |
| 6,798,409 B2 * | 9/2004 | Thomas et al. | 345/427 |
| 7,483,043 B2 | 1/2009 | Morgan et al. | |

(Continued)

FOREIGN PATENT DOCUMENTS

| | | | | |
|---|---|---|---|---|
| WO | WO 2005/009052 A1 * | 1/2005 | | H04N 13/02 |
| WO | WO 2005009052 A1 * | 1/2005 | | H04N 13/0242 |

(Continued)

OTHER PUBLICATIONS

Christoudias, et al., "Multi-View Learning in the Presence of View Disagreement", Proceedings of Conference on Uncertainty in Artificial Intelligence (UAI), Jul. 30, 2008, pp. 9.

(Continued)

*Primary Examiner* — Shawn An
(74) *Attorney, Agent, or Firm* — Rainier Patents, P.S.

(57) ABSTRACT

Described is using a combination of which a multi-view display is provided by a combining spatial multiplexing (e.g., using a parallax barrier or lenslet), and temporal multiplexing (e.g., using a directed backlight). A scheduling algorithm generates different views by determining which light sources are illuminated at a particular time. Via the temporal multiplexing, different views may be in the same spatial viewing angle (spatial zone). Two of the views may correspond to two eyes of a person, with different video data sent to each eye to provide an autostereoscopic display for that person. Eye (head) tracking may be used to move the view or views with a person as that person moves.

20 Claims, 3 Drawing Sheets

(56) References Cited

U.S. PATENT DOCUMENTS

| | | | |
|---|---|---|---|
| 7,738,050 B2* | 6/2010 | Yamazaki | G02F 1/1368 349/43 |
| 8,144,079 B2* | 3/2012 | Mather | G09G 3/003 345/32 |
| 8,384,710 B2* | 2/2013 | Schlottmann | G06T 15/00 345/419 |
| 2001/0001566 A1* | 5/2001 | Moseley et al. | 349/15 |
| 2002/0126389 A1 | 9/2002 | Moseley et al. | |
| 2003/0025995 A1 | 2/2003 | Redert et al. | |
| 2004/0130501 A1 | 7/2004 | Kondo et al. | |
| 2004/0192430 A1 | 9/2004 | Burak et al. | |
| 2007/0013624 A1 | 1/2007 | Bourhill | |
| 2007/0216828 A1* | 9/2007 | Jacobs | 349/64 |
| 2008/0068329 A1 | 3/2008 | Shestak et al. | |
| 2008/0068446 A1 | 3/2008 | Barkley et al. | |
| 2008/0088935 A1 | 4/2008 | Daly | |
| 2008/0316378 A1* | 12/2008 | Huang | G02B 27/2214 349/15 |
| 2009/0002819 A1 | 1/2009 | Kim et al. | |
| 2009/0040426 A1 | 2/2009 | Mather et al. | |
| 2009/0251638 A1 | 10/2009 | Hsu et al. | |
| 2009/0295835 A1 | 12/2009 | Husoy | |
| 2010/0002006 A1 | 1/2010 | Mauchly et al. | |
| 2010/0002079 A1* | 1/2010 | Krijn | G02B 27/0093 348/148 |
| 2010/0026797 A1 | 2/2010 | Meuwissen et al. | |
| 2010/0164861 A1* | 7/2010 | Ju et al. | 345/156 |
| 2010/0208033 A1* | 8/2010 | Edge et al. | 348/46 |
| 2011/0090413 A1* | 4/2011 | Liou | 349/15 |
| 2011/0157339 A1* | 6/2011 | Bennett et al. | 348/59 |
| 2011/0164188 A1* | 7/2011 | Karaoguz et al. | 348/734 |
| 2011/0193863 A1 | 8/2011 | Gremse et al. | |
| 2011/0261169 A1* | 10/2011 | Tin | G09G 3/003 348/51 |
| 2011/0285968 A1* | 11/2011 | Huang | G03B 35/24 353/31 |
| 2011/0310233 A1 | 12/2011 | Bathiche | |
| 2012/0013651 A1 | 1/2012 | Trayner et al. | |
| 2012/0092573 A1* | 4/2012 | Chen et al. | 349/15 |
| 2016/0080736 A1 | 3/2016 | Bathiche et al. | |

FOREIGN PATENT DOCUMENTS

| | | |
|---|---|---|
| WO | WO2008/122838 | 10/2008 |
| WO | WO2009/057030 | 5/2009 |

OTHER PUBLICATIONS

Hubner, et al., "Single-pass multi-view volume rendering", Proceedings IADIS International Conference Computer Graphics and Visualization, 2007, pp. 9.

Annen, et al., "Distributed Rendering for Multiview Parallax Displays", Retrieved at « http://graphics.ucsd.edu/~matthias/Papers/DistributedRenderingForMultiviewParallaxDisplays.pdf », Proceedings of Stereoscopic Displays and Virtual Reality Systems XIII, 2006, pp. 10.

"Autostereoscopy", Retrieved at « http://en.wikipedia.org/wiki/Autostereoscopy », May 12, 2010, pp. 1-2.

Notice of Allowance dated Aug. 27, 2015 from U.S. Appl. No. 12/819,239, 5 pages.

Corrected Notice of Allowability dated Oct. 30, 2015 from U.S. Appl. No. 12/819,239, 6 pages.

Preliminary Amendment filed Nov. 23, 2015 from U.S. Appl. No. 14/949,550, 7 pages.

Non-Final Office Action dated Oct. 18, 2012 from U.S. Appl. No. 12/819,239, 24 pages.

Final Office Action dated Jun. 20, 2013 from U.S. Appl. No. 12/819,239, 24 pages.

Non-Final Office Action dated Nov. 22, 2013 from U.S. Appl. No. 12/819,239, 28 pages.

Final Office Action dated Jun. 24, 2014 from U.S. Appl. No. 12/819,239, 49 pages.

Notice of Allowance and Applicant-Initiated Interview Summary dated Feb. 23, 2015 from U.S. Appl. No. 12/819,239, 24 pages.

Non-Final Office Action dated Aug. 23, 2017 from U.S. Appl. No. 14/949,550, 42 pages.

Final Office Action dated Feb. 8, 2018 from U.S. Appl. No. 14/949,550, 25 pages.

* cited by examiner

SPATIAL AND TEMPORAL MULTIPLEXING DISPLAY

CROSS-REFERENCE TO RELATED APPLICATION

The present application is related to the copending U.S. patent application 12/819,239, entitled "Optimization of a Multi-View Display," assigned to the assignee of the present application, filed concurrently herewith and hereby incorporated by reference.

BACKGROUND

Display technology is evolving, including to the point where general consumers today can purchase 3D (three-dimensional/stereoscopic) televisions. In general, 3D televisions display separate video frames to each eye via 3D glasses with lenses that block certain frames and pass other frames through.

Spatial multiplexing is another recent advancement, in which a lenticular display uses lenses (parallax barriers/lenslets) in front of light sources (e.g., light emitting diodes/LEDs or liquid crystal displays/LCDs) to display separate views to different viewing angles (zones). The highest lenticular display, for example, enables nine separate views, whereby viewers of the display who are positioned at appropriate angles (e.g., zones ten degrees apart) can each see a different image at the same time.

However, spatial multiplexing comes at the cost of resolution, in that nine vertical columns of pixels on an LCD display, for example, are needed to produce a single effective column of pixels for each viewing angle in the nine-view display. Given the limited resolution of LCD displays, this one-ninth degradation of effective horizontal resolution is dramatic, particularly when considering that the effective vertical resolution is unchanged (and therefore significantly mismatched with the horizontal resolution).

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a multi-view display is provided by combining spatial multiplexing (e.g., using a parallax barrier or lenslet), and temporal multiplexing (e.g., using a directed backlight). A scheduling algorithm generates a plurality of views by determining which light sources are illuminated at a particular time. Two of the views may correspond to two eyes of a person, with different video data sent to each eye to provide an autostereoscopic display for that person. Eye (head) tracking may be used to move the view or views with a person as that person moves.

In one aspect, positions of a first view and a second view are used to determine subsets of light sources (e.g., pixel columns) of a display that, when illuminated behind a lens, direct light to a spatial viewing angle (zone) corresponding to the both the first view and the second view. In a first time slice, selected light sources of the subsets are illuminated to direct collimated light corresponding to first video data to the first view. In a second time slice, other selected light sources of the subsets are illuminated to direct collimated light corresponding to second video data to the second view. In this manner, for example, two or more views may be displayed within the same spatial viewing angle.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards combining temporal and spatial multiplexing to achieve desired video output, such as generating more views than either technique can deliver independently. In one aspect, spatial multiplexing (using a parallax barrier or lenslet) provides different views to different viewing angles, while temporal multiplexing (e.g., via a collimated directed backlight) directs views based on illuminating only selected light sources at any given time, e.g., at a sufficiently high frequency that flicker is not detected by a viewer. When used with known head tracking technology that determines the position of a viewer's eyes, the combined temporal and spatial multiplexing can provide each person (or each individual eye of a person) with a separate view in both space and time, thereby providing a multiplicative effect as to the number of individual views possible.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and video technology in general.

Figure 1:
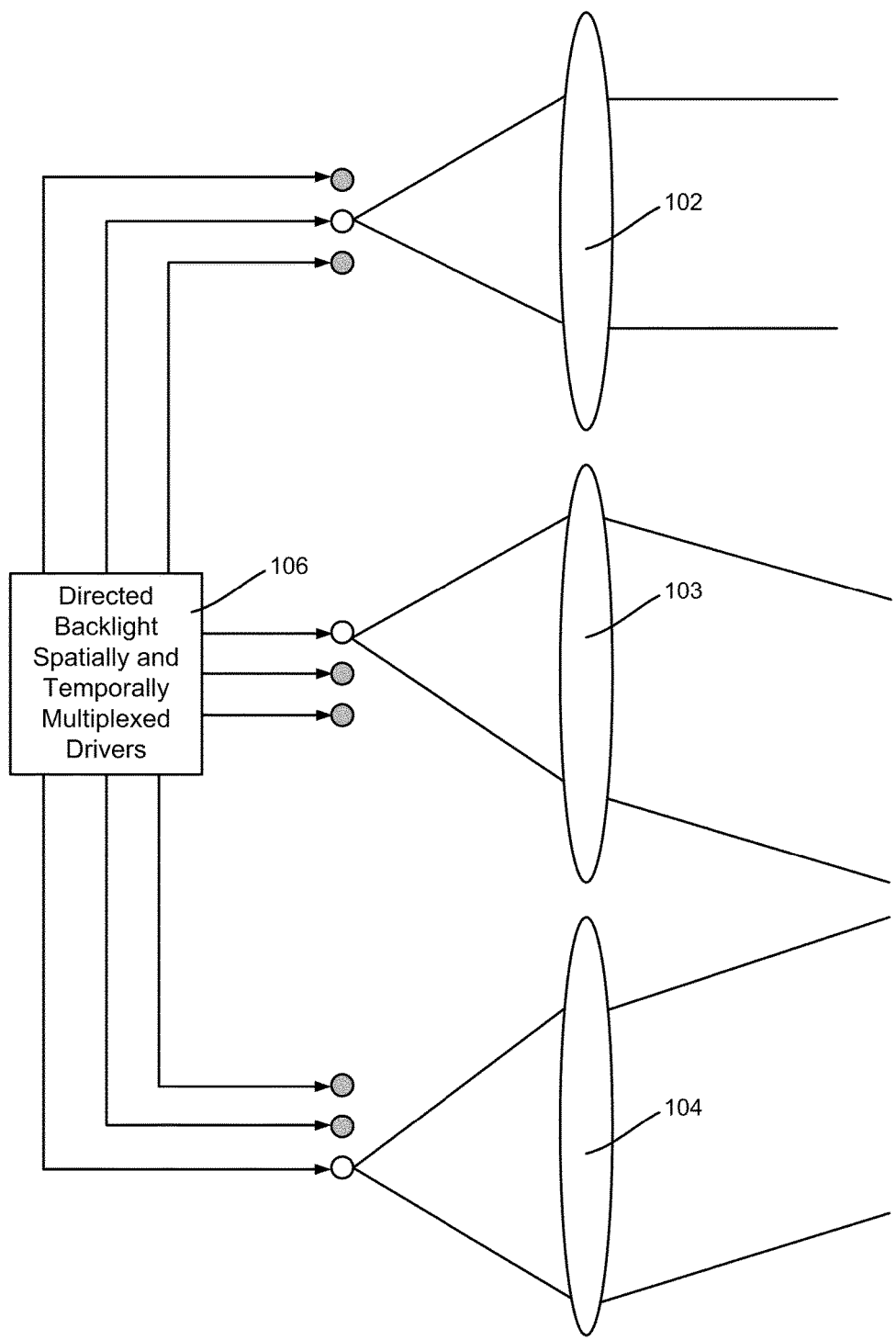
FIG. 1 is a representation of a directed backlight technology for use in temporal and spatial multiplexing, in which a directed backlight collimates light generated by one or more light sources.

FIG. 1 represents how a time-multiplexed collimated directed backlight's arrayed light sources (e.g., LEDs or LCDs represented by the small circles in FIG. 1) are aligned with lenses 102-104 to output different photons to different viewing angles based on which light source is illuminated (shown as a white circle) at any time. In general, a directed backlight collimates light generated by one or more light sources, in which the angle of the collimated light depends on the position of the currently illuminated one or more LEDs or LCDs with respect to the focal point of the lens. As can be readily appreciated, in a practical display there are millions of such light sources, and any one-dimensional or two-dimensional array of such light sources may be used, as appropriate for any shape of lens, e.g., convex, cylindrical, spherical and so forth.

In general and as described herein, software and hardware using a combination of spatial and temporal multiplexing techniques control the drivers 106 to illuminate only selected light sources during a given time slice, for each of the arrays of light sources for a given spatial angle, such that multiple views are provided. Note that while spatial multiplexing is thus generally based on a mechanical design of arrayed light sources and lenses, the design also influences how temporal multiplexing works in conjunction with the spatial multiplexing, and determines the range of applications for which the combination of spatial and temporal multiplexing is suited.

While the capabilities of the spatial multiplexing are largely fixed because they are due to a fixed physical construction (e.g., a lenticular array), temporal multiplexing is inherently dynamic and thus can be configured to select varying patterns of illumination over time, supporting varying kinds of applications, depending on the programming of the directed backlight pattern.

For example, by both temporally multiplexing (using a collimated directed backlight) to provide X views based on the frame rate capabilities of the display device and spatially multiplexing (e.g., using a parallax barrier/lenticular display or a lenslet display according to the spatial capabilities of the display device) to provide Y views, up to X times Y views may be generated for a given display. When used with a head tracking system, these views may each be steered to the current and/or expected location of an eye to maintain a relatively high resolution for each of the views. As a more particular example, given a 480 hertz display (which presently exist), it is possible to generate four autostereoscopic views (3D views without glasses, accomplished by directing a different view to each eye) using temporal multiplexing alone, each view receiving frames at 120 hertz. By including spatially multiplexing functionality capable of generating four views, for example, the display is able to generate sixteen different views. Note that in this example seven more views are provided than the nine-view lenticular display provides, yet the horizontal resolution not as degraded, that is, only by one-fourth compared to one-ninth.

It should be understood that as used herein, a "view" may refer to an individual eye of a person, such as when displaying stereoscopic (3D) video; alternatively, a view may be the same to both of a person's eyes. Thus, the sixteen views in the above example may be generated to show personal stereoscopic video to eight viewers, one different view to each eye. Note that a "personal" view means that one viewer may be receiving different video images relative to the images received by another viewer, such as for viewing a view of the same scene as seen by another viewer, but from a different angle, for example, or for "simultaneously" (but possibly time multiplexed) watching different television shows on the same display. Further note that if there are more eyes than available views, some or all of the views may be used for outputting 2D video, and/or non-personal 3D video, as generally described in the aforementioned related U.S. patent application entitled "Optimization of a Multi-View Display."

One other advantage of combining spatial and temporal multiplexing is that a known shortcoming of lenticular autostereoscopic displays may be remedied. More particularly, parallax barrier techniques generate a set of fixed views that repeat in a regular fashion over the whole viewing angle of the display. For example, as the user moves from left to right, a parallax barrier may generate views ranging sequentially from view one, to view two, to view three. As the user moves further right, the display returns to view one, then to view two, then to view three and so on.

This repeating nature of the views is a problem in scenarios where it is desirable to present unique views throughout the viewing range of the display. For example, it may be desirable to present unique views to multiple people, such as in one possible scenario in which a simulated viewing experience is that two people are looking at the same 3D object, but with correct parallax effects. That is, the two people see the object at the same 3D position (at the same room coordinates), however each can see a part of the object that the other cannot, corresponding to a correct viewing angle; their views are as if they are both looking at an object in the room from different angles, rather than the usual autostereoscopic experience where both users have precisely the same viewing experience. For example, one person may see the front of a box, while the other sees the side. As the person seeing the front moves to a different viewing angle (e.g., view two), that person sees part of the side of the box as well. With parallax barrier techniques/repeating views, as the person moves too far (e.g., past view three), instead of seeing the box from a corresponding angle, with only spatial multiplexing, the view jumps back to the initial front-of-the box view.

Another advantage of the combination of spatial and temporal multiplexing is that the demands on each technique may be lessened while still maintaining a useful number of views. As mentioned above, the highest contemporary lenticular display enables nine separate views, but this results in significantly degraded resolution. By employing temporal multiplexing, the lenticular display may be designed to support fewer spatial views, such as three, thereby reducing the adverse effect on resolution. However, in the above example, time multiplexing via the directed backlight can still provide (at least) the nine views at an acceptable frame rate.

Turning to another aspect, dynamically driving the temporal multiplexing facilitates exploiting various information that allows determination of when and how to enable a particular view by the directed backlight. For example, if the system is used with face or eye tracking technology, the system can only enable views that would fall on the users' eyes, thus potentially increasing frame rate and/or brightness, and/or saving energy.

By way of example, consider a 240 hertz display with three spatially multiplexed views, providing up to twelve views at 60 hertz each. If a single person is viewing the display, significant energy may be saved by showing only one view to that user. However, user preference data may be accessed to determine how to trade off desired quality versus energy saving, e.g., a user may want higher resolution and a higher frame rate/brightness than that provided if the maximum number of views were being generated. In general, the dynamic aspect of the temporal multiplexing allows the ordering and scheduling of views in a dynamic fashion to support efficient illumination strategies that preserve resolutions and brightness.

Note that the views shown to different people need not have the same actual or perceived quality. For example, one person may get a higher frame rate than another, at least for awhile, so as to not noticeably degrade one person's viewing experience just because another person happens to be walking through room and glances at the display. A person watching a show with significant motion (e.g., as determinable from MPEG motion information) such as a sporting event may get a higher frame rate than a person watching the same display at the same time to view a program will less motion, such as a drama. Thus, for example, a person watching a show with a lot of motion may receive more time slices (e.g., corresponding to a higher frame rate) than another person watching a show with less motion.

Figure 2:
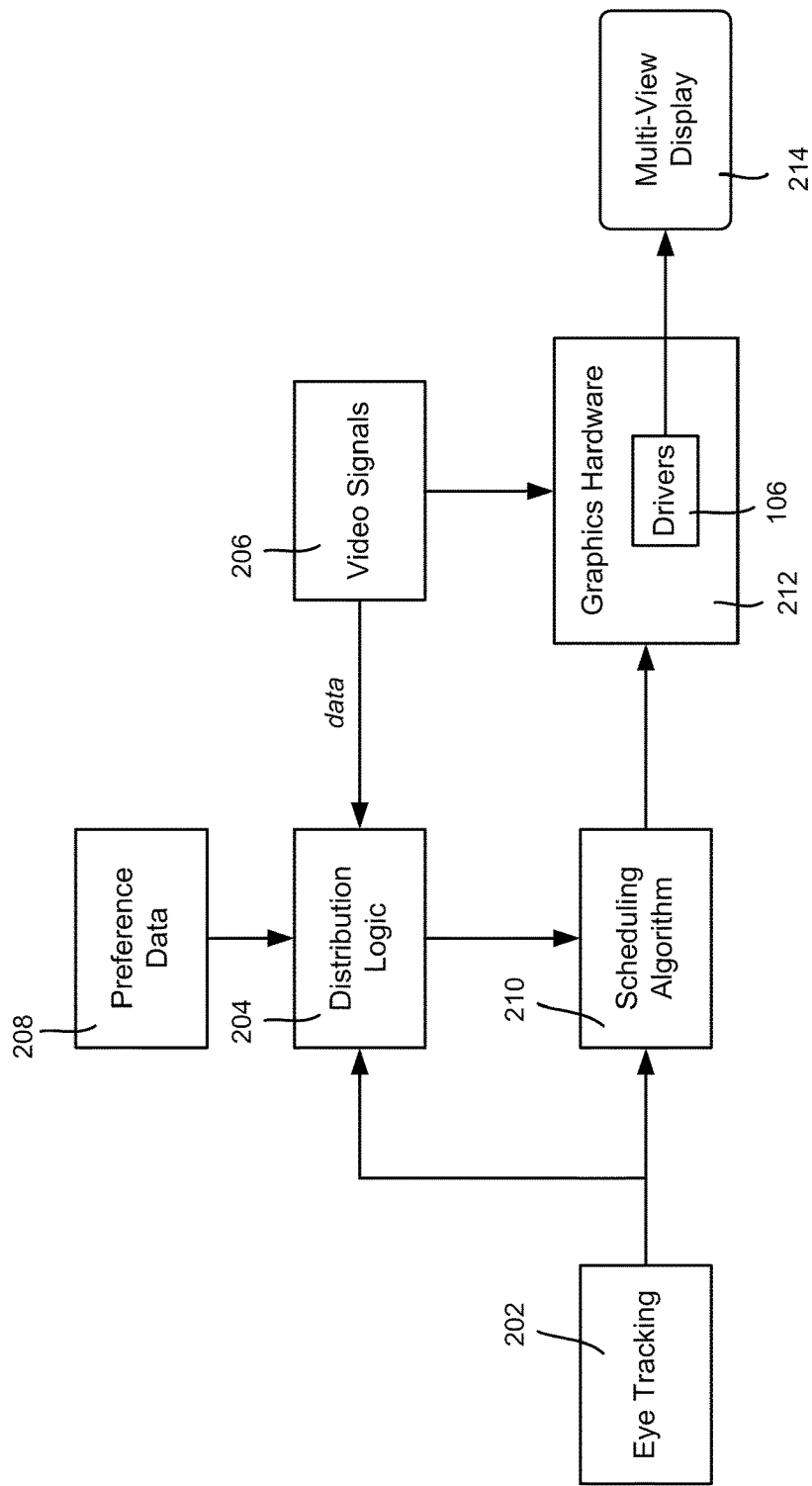
FIG. 2 is a block diagram representing a temporal and spatial multiplexing system that generates separate views.

FIG. 2 is a block diagram showing an example implementation that combines spatial and temporal multiplexing to provide a plurality of (typically) differing views. The various components of FIG. 2 may be implemented in computing environment external to a display, e.g., in a computer system or gaming console, for example, containing one or more processors and memory to perform spatial and temporal multiplexing. Alternatively, the components may be incorporated into a display device, such as a television set.

In the example of FIG. 2, an eye (head) tracking component 202 (e.g., using one or more cameras and software technology) provides a distribution mechanism/distribution logic 204 with the current number of views (eyes) and the initial position of each eye. Note that such head tracking already exists, based on known machine vision software technology, and may be incorporated into gaming consoles, for example. Notwithstanding, any eye tracking technology may be used as described herein, including technology not yet developed.

Note that the video signals may be anything, such as a single video shot, a mix of different angles of the same 3D scene, a mix of different video shots (e.g., two television programs to distribute between different viewers) and so forth. Thus, other data that may be needed in association with each view is a content identifier. In general, if different people are currently using the multi-view display to view different video clips (e.g., television shows), there needs to be an association between each view and the content to show to that view. For example, a user can make a head gesture or other gesture so that the head tracking component can associate the person's eyes with a position, in conjunction with that person using a remote control to indicate the show that the user wants to see. Thereafter, the person sees that show until otherwise changed.

Note that if all views are of the same 3D scene but some (or all) views correspond to different viewing angles, the content to show each view may be known based on the position. In such a scenario, the position data of each view serves as the "content" identifier, namely the angle at which the content is viewed.

As described herein, the distribution logic 204 determines how to distribute video signals 206 among the views via spatial and temporal multiplexing. Preference data 208 (which may be fixed defaults for a given display device) may be accessed to determine how the distribution proceeds, e.g., how to correlate more views than can be output given the spatial and frame rate capabilities of the device, or conversely, when less than all possible views are present, how to increase resolution and brightness, and/or to which view or views, and so forth. Note that the distribution logic 204 also may input (data corresponding to) the video signals, such as to determine whether the video is 2D or 3D, and also to possibly process motion information in determining the distribution.

The distribution logic 204 provides the computed parameters (e.g., sets of a view number, initial position, timing data, and content identifier) to a scheduling algorithm 210. In general, the scheduling algorithm 210 outputs spatial and temporally multiplexed signals to graphics hardware 212 to control which drivers 106 illuminate which LEDs/LCDs and when, thereby providing a multi-view display 214. This may include non-illuminated frames to views where there is no viewer present, to save energy.

Figure 3:
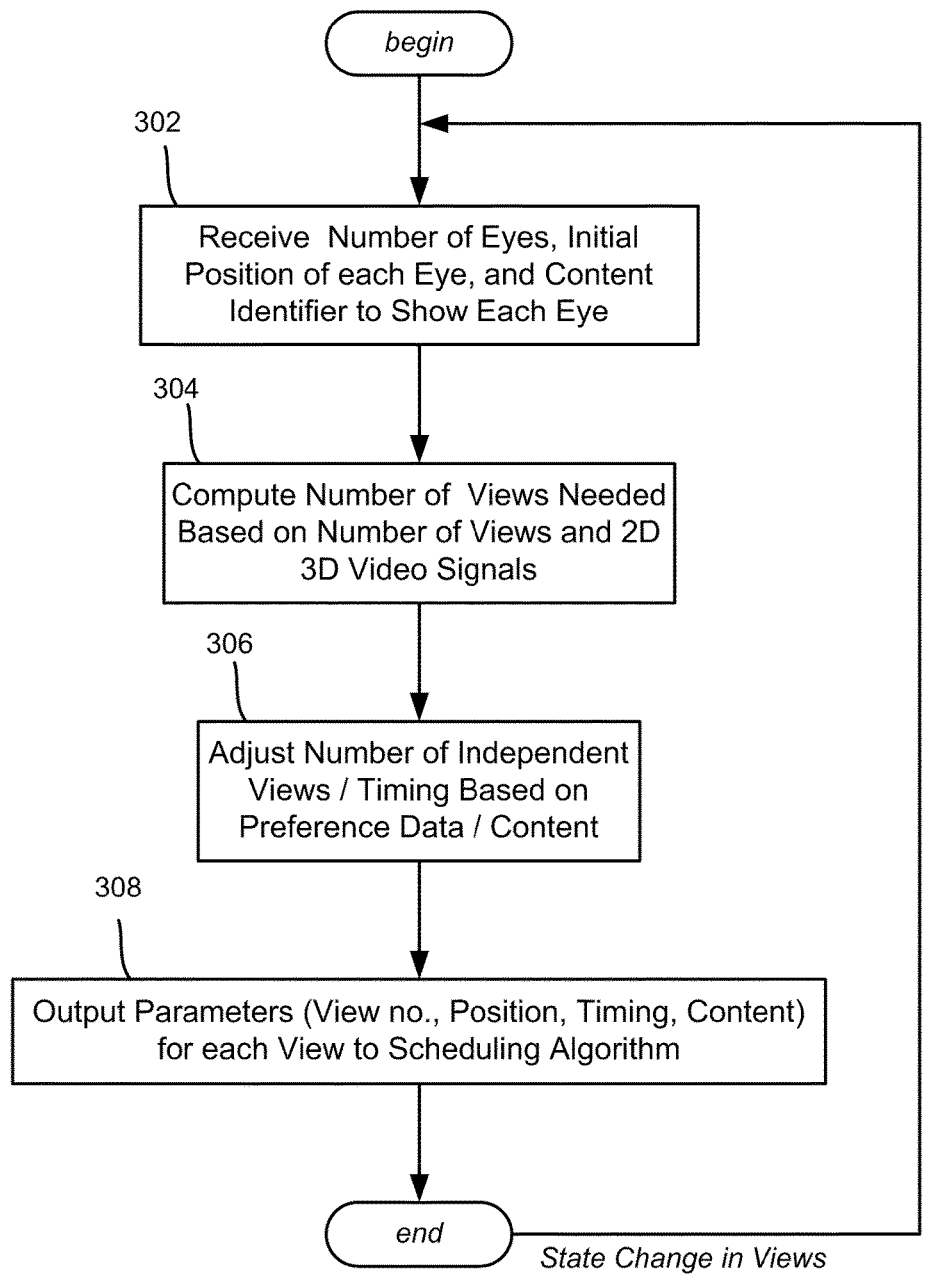
FIG. 3 is a flow diagram representing example steps for computing views based on various input including a number of views desired.

FIG. 3 shows some example steps that may be performed by the distribution logic 204, beginning at step 302 where the number of eyes (maximum possible views desired) is received from the head tracking component. At step 304, the distribution logic 204 computes how many views are needed based upon the number of views and the 2D and/or 3D nature of the video signals 206. As described above, the preference data 208 is consulted to determine what to do when there is an inexact match between the views needed versus those that can be independently generated, e.g., which view or views are to be degraded (e.g., combined) or enhanced according to the preference data 208, given the current number of possible views. Content-based throttling or enhancement may also be performed, e.g., based on how the preference data specifies that current motion information be used, as described above.

In general, the scheduling algorithm 210 receives parameters from the distribution logic 204, e.g., a set of numbered views, the position that the view is currently at, the timing data for that view (e.g., if it is not equally divided for every view), and what content to display to that view, if needed.

Given the parameters and the position information from the head tracking component, the scheduling algorithm 210 computes the spatial and temporal multiplexed output for each view, that is, which light sources to illuminate based on the view's frame rate to show a video frame to a particular view's current position. Note that in this example the scheduling algorithm 210 receives the position data and re-computes which light sources to illuminate for a view's viewing time as each person moves, and thus the distribution logic 204 does not need to re-compute the parameters each time a person moves. However in this example, the distribution logic 204 re-computes the parameters when there is a state change with respect to the number of views, e.g., one viewer leaves or another one joins, and so forth. State change is further described in the aforementioned related U.S. patent application entitled "Optimization of a Multi-View Display."

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A multi-view display comprising:
    multiple light sources configured to generate light;
    a parallax barrier or lenslet configured to direct the light to different directions depending on which of the multiple light sources are illuminated; and
    a scheduling algorithm configured to direct the light to different viewing angles by selectively illuminating different light sources behind the parallax barrier or lenslet in different time slices, wherein the different viewing angles correspond to different views,
    wherein the different views include a first view that is directed to a first viewing angle by illuminating a first light source behind the parallax barrier or lenslet during a first time slice and a second view that is directed to a second viewing angle by illuminating a second light source behind the parallax barrier or lenslet during a second time slice, wherein the first viewing angle is different than the second viewing angle.

2. The multi-view display of claim 1 wherein the different views includes a third view directed toward a first eye of a third person and a fourth view directed to a second eye of the third person.

3. The multi-view display of claim 1, further comprising:
an eye or head tracking component configured to track eye or head positions of a first person and a second person,
wherein the scheduling algorithm is configured to receive position data from the eye or head tracking component and to redirect one or more of the different views based on the position data.

4. The multi-view display of claim 3, wherein the eye or head tracking component comprises one or more cameras.

5. The multi-view display of claim 1, wherein the different views correspond to at least two different television programs displayed concurrently on the multi-view display.

6. The multi-view display of claim 1, further comprising:
a distribution mechanism configured to compute timing parameters based at least in part on a desired number of views,
wherein the scheduling algorithm is configured to use the timing parameters to generate the different views.

7. The multi-view display of claim 6, wherein the distribution mechanism computes the timing parameters for the different views based upon corresponding content.

8. The multi-view display of claim 6, wherein the distribution mechanism is configured to compute timing or resolution parameters, or both timing and resolution parameters, based upon a number of the different views that are generated.

9. The multi-view display of claim 6, wherein the distribution mechanism is configured to compute timing or resolution parameters, or both timing and resolution parameters, based upon preference data.

10. The multi-view display of claim 1, wherein the multiple light sources comprise multiple light emitting diodes or multiple liquid-crystal displays.

11. The multi-view display of claim 1, wherein the multi-view display has a given rating in hertz and different views are provided at hertz rates that are divisors of the given rating.

12. The multi-view display of claim 11, wherein the given rating is 480 hertz and the divisors are 120 hertz.

13. A system comprising the multi-view display of claim 1 and a computing environment comprising a hardware processor configured to execute the scheduling algorithm.

14. The system of claim 13, wherein the computing environment comprises a gaming console.

15. The system of claim 13, embodied as a television set.

16. The multi-view display of claim 1, wherein the scheduling algorithm is further configured to concurrently display different shows to different viewers at different frame rates.

17. The multi-view display of claim 16, wherein the different shows displayed concurrently include a sporting event and a drama, and the scheduling algorithm is configured to concurrently show the sporting event at a higher frame rate than the drama.

18. The multi-view display of claim 1 having the lenslet, wherein the lenslet and the multiple light sources are positioned such that the lenslet directs the light to the first view when the first light source is illuminated and the lenslet directs the light to the second view when the second light source is illuminated.

19. The multi-view display of claim 1 having the lenslet, wherein the lenslet and the multiple light sources are positioned such that the lenslet directs the light to the first view and not the second view when the first light source is illuminated and the lenslet directs the light to the second view and not the first view when the second light source is illuminated.

20. The multi-view display of claim 1, wherein the scheduling algorithm is configured to selectively illuminate the light sources such that a first portion of an object is shown to a first person during a first time slice and a second portion of the object is shown to a second person during a second time slice, wherein the first portion of the object shown during the first time slice is not visible to the second person and the second portion of the object shown during the second time slice is not visible to the first person.

* * * * *